(12) United States Patent
Subbunarayanan et al.

(10) Patent No.: US 11,520,686 B2
(45) Date of Patent: Dec. 6, 2022

(54) SYSTEM AND METHOD FOR FACILITATING PERFORMANCE TESTING

(71) Applicant: The Toronto-Dominion Bank, Toronto (CA)

(72) Inventors: Periyakaruppan Subbunarayanan, Mississauga (CA); Aayush Kathuria, Brampton (CA); Kevin Aird, Toronto (CA)

(73) Assignee: The Toronto-Dominion Bank, Toronto (CA)

(*) Notice: Subject to any disclaimer, the term of this patent is extended or adjusted under 35 U.S.C. 154(b) by 0 days.

(21) Appl. No.: 17/248,458

(22) Filed: Jan. 26, 2021

(65) Prior Publication Data

US 2022/0237107 A1 Jul. 28, 2022

(51) Int. Cl.
  *G06F 11/36* (2006.01)
  *G06F 8/73* (2018.01)
(52) U.S. Cl.
  CPC ...... *G06F 11/3684* (2013.01); *G06F 11/3664* (2013.01); *G06F 11/3688* (2013.01); *G06F 8/73* (2013.01)
(58) Field of Classification Search
  CPC .......... G06F 11/36–3696; G06F 8/73
  See application file for complete search history.

(56) References Cited

U.S. PATENT DOCUMENTS 8,561,036 B1 * 10/2013 Beans .................. G06F 11/368
                                         717/124
8,756,586 B2   7/2014 Khanapurkar et al.
(Continued)

FOREIGN PATENT DOCUMENTS

WO    2016/133855 A1    8/2016
WO    2017/142393 A1    8/2017

OTHER PUBLICATIONS

Weyuker, E. J.; Avritzer, A.; "A metric for predicting the performance of an application under a growing workload"; IBM Systems Journal (vol. 41, Issue: 1, 2002); https://citeseerx.ist.psu.edu/viewdoc/download?doi=10.1.1.89.8026&rep=rep1&type=pdf.

(Continued)

*Primary Examiner* — Todd Aguilera
(74) *Attorney, Agent, or Firm* — CPST Intellectual Property Inc.; Brett J. Slaney

(57) ABSTRACT

System and method are provided for facilitating performance testing. The method includes mapping application code for an application under test to at least one performance test script to generate a functionality mapping, the test script for executing functions in the application under test, receiving build release notes, determining at least one source code change from the build release notes, and receiving volume data from a production environment for the application under test. The method also includes using the build release notes and the functionality mapping to identify the source code changes for at least one functionality to be tested and for each functionality to be tested, analyzing corresponding volume data for a period of time, and using the volume data from the production environment to generate or update a workload model for the at least one functionality to provide a framework for subsequent performance testing of the application under test.

18 Claims, 10 Drawing Sheets

(56) References Cited

U.S. PATENT DOCUMENTS

| | | | |
|---|---|---|---|
| 8,924,938 B2 | 12/2014 | Chang et al. | |
| 9,021,362 B2 | 4/2015 | Broda et al. | |
| 9,026,853 B2 | 5/2015 | Zemer et al. | |
| 9,064,049 B2 * | 6/2015 | Zinkovsky | H04L 65/1066 |
| 9,304,891 B1 * | 4/2016 | Angleton | G06F 11/3414 |
| 9,529,699 B2 | 12/2016 | Rajan et al. | |
| 10,089,217 B2 * | 10/2018 | Best | G06F 11/3684 |
| 10,176,022 B2 | 1/2019 | Altman et al. | |
| 10,339,037 B1 * | 7/2019 | Chatterjee | G06F 11/3684 |
| 10,606,736 B1 * | 3/2020 | Gardner | G06F 11/302 |
| 11,061,806 B2 * | 7/2021 | Viswanathan | G06F 11/3688 |
| 2012/0151452 A1 * | 6/2012 | Zinkovsky | H04L 65/1066 |
| | | | 717/129 |
| 2016/0085663 A1 * | 3/2016 | Best | G06F 11/3684 |
| | | | 714/38.1 |
| 2019/0317885 A1 | 10/2019 | Heinecke et al. | |
| 2020/0089594 A1 * | 3/2020 | Zhou | G06F 11/3664 |
| 2021/0056007 A1 * | 2/2021 | Viswanathan | G06F 11/3692 |

OTHER PUBLICATIONS

Avritzer,.; Kondek, J.; Liu, A.; Weyuker, E.J.; Software performance testing based on workload characterization; Proceedings of the 3rd international workshop on Software and performance (Jul. 2002); https://dl.acm.org/doi/10.1145/584369.584373.

* cited by examiner

SYSTEM AND METHOD FOR FACILITATING PERFORMANCE TESTING

TECHNICAL FIELD

The following relates generally to facilitating performance testing.

BACKGROUND

As the number of mobile users increases, so too does the importance of measuring performance metrics on mobile devices. For example, it is found that users expect applications (also referred to herein as "apps") to load within a short amount of time, e.g., about two seconds. Because of this, some feel that native app load times should be as fast as possible. Additionally, poor app performance can impact an organization in other ways, for example, by increasing the number of technical service requests or calls, as well as negatively impacting ratings or rankings in application marketplaces (e.g., app stores), or more generally reviews or reputation. These negative impacts can also impact customer retention and uptake, particularly for younger generations who value their ability to perform many tasks remotely and with mobility.

Mobile performance testing typically measures key performance indicators (KPIs) from three perspectives, namely the end-user perspective, the network perspective, and the server perspective. The end-user perspective looks at installation, launch, transition, navigation, and uninstallation processes. The network perspective looks at network performance on different network types. The server perspective looks at transaction response times, throughput, bandwidth, and latency. This type of testing is performed in order to identify root causes of application performance bottlenecks to fix performance issues, lower the risk of deploying systems that do not meet business requirements, reduce hardware and software costs by improving overall system performance, and support individual, project-based testing and centers of excellence.

Performance workload modelling is typically a manual and often tedious task. Defining a workload model for an application under test can be challenging since it requires knowledge of both the application and the business model it is meant to serve. Before running a performance test, the performance or test engineer may need to model the production workload accurately, set up the test environment and equipment, and establish benchmark baselines for the tests, among other things. An inaccurate workload model can lead to misguided optimization efforts, delayed system deployment, failures, and/or an inability to meet service-level agreements or other requirements for the system. That is, having an accurate workload model can be important for the reliable deployment of any system, particularly those meant to support a large number of users in a production environment.

BRIEF DESCRIPTION OF THE DRAWINGS

Embodiments will now be described with reference to the appended drawings wherein.

DETAILED DESCRIPTION

Figure 1:
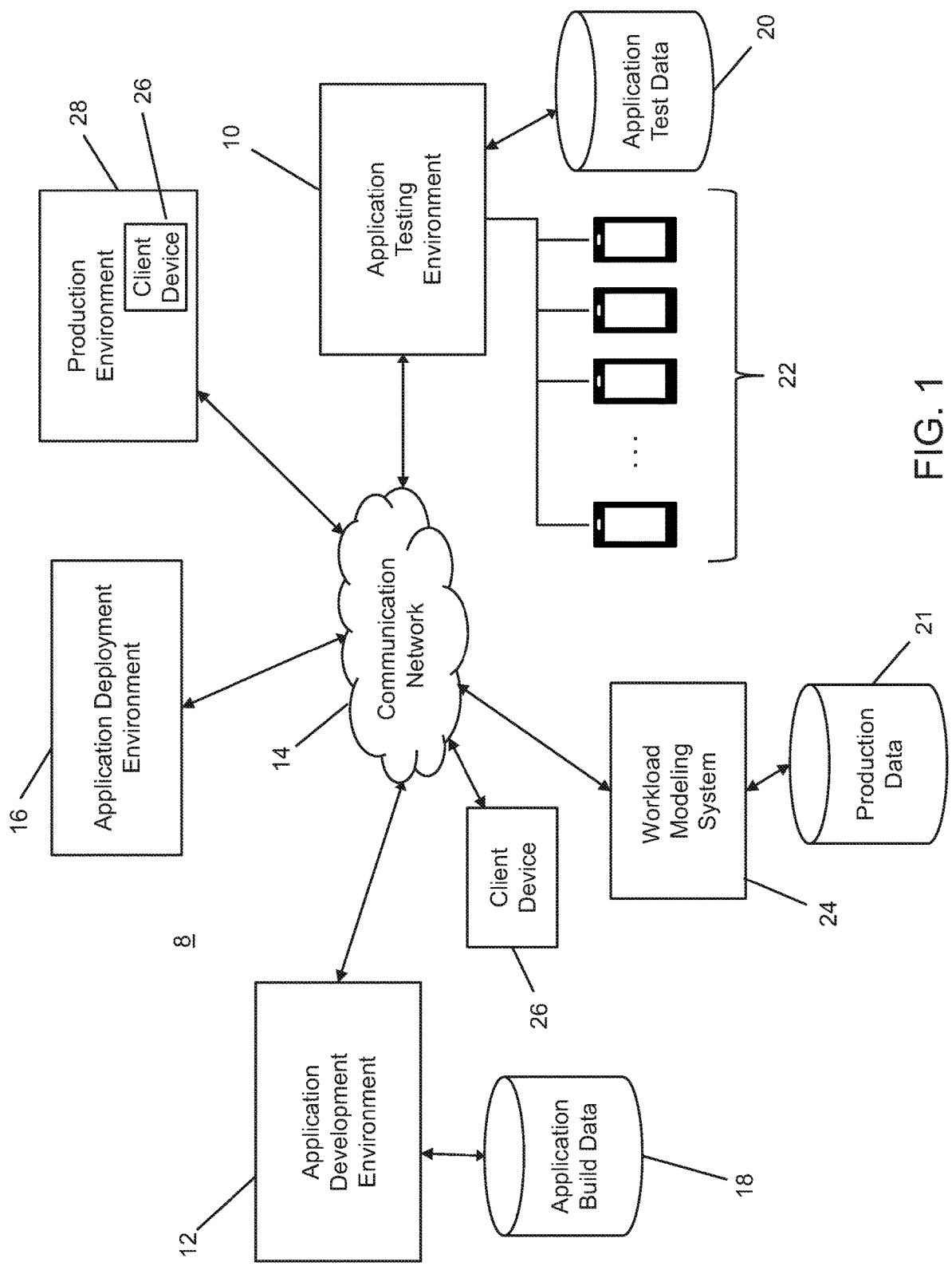
FIG. 1 is a schematic diagram of an example computing environment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

It is recognized that the non-functional requirements (NFRs) provided for an application that undergoes performance testing are found to not necessarily be reflective of what is seen in the production environment, since the volumes of devices and workload requirements keep changing on a daily basis. Currently, there is no automated mechanism to bridge a feedback loop from the production environment. As such, most performance tests are based on estimated volumes provided to the performance test engineers. Moreover, there is no guarantee on code coverage for performance testing.

The following generally relates to a system that facilitates performance testing by providing an intelligent regression modeling engine or platform (referred to herein as a "workload modeling system"), to automate production feedback, and to optionally initiate performance testing automatically. The workload modeling system provides a customized tool to automatically create and bridge a feedback loop from the production environment, by generating and executing a process to generate and/or update a workload model that can be configured to automatically initiate a performance test.

The workload modeling system can be used to introduce a process to map application code to various functionalities supported by the application. The process then creates a map of the application code to performance test scripts. The notes of the build that are released can also be populated with detailed information on what are the actual source code changes. The process can read the build release notes, obtain the application functionality mapping and, for each respective functionality, analyze a period of time's worth (e.g., 3 months) of volume data from the production environment.

With the functionalities from the release notes and the volume-related production data from the production environment, the process can automatically create or update the workload model. The workload model can then be used as a framework for continuous performance testing, avoiding much of the tedious manual efforts normally required.

As used herein a "build" may refer to the process of creating an application program for a software release, by taking all the relevant source code files and compiling them and then creating build artifacts, such as binaries or executable program(s), etc. "Build data" may therefore refer to any files or other data associated with a build. The terms "build" and "build data" (or "build file") may also be used interchangeably to commonly refer to a version or other manifestation of an application, or otherwise the code or program associated with an application that can be tested for performance related metrics.

It will be appreciated that while examples provided herein may be primarily directed to automated testing and workload modeling of mobile applications, the principles discussed herein equally apply to applications deployed on or otherwise used by other devices, such as desktop or laptop computers, e.g., to be run on a web browser or locally installed instance of an application. Similarly, the principles described herein can also be adapted to any performance engineering environment in which executable tasks are implemented, whether they include development, testing, implementation, production, quality assurance, etc.

Certain example systems and methods described herein are able to facilitate performance testing, e.g., in a performance engineering environment. In one aspect, there is provided a device for facilitating performance testing. The device includes a processor, a communications module coupled to the processor, and a memory coupled to the processor. The memory stores computer executable instructions that when executed by the processor cause the processor to map application code for an application under test to at least one performance test script to generate a functionality mapping, the test script for executing functions in the application under test. The computer executable instructions, when executed, also cause the processor to receive via the communications module, build release notes; determine at least one source code change from the build release notes; and receive via the communications module, volume data from a production environment for the application under test. The computer executable instructions, when executed, also cause the processor to use the build release notes and the functionality mapping to identify the source code changes for at least one functionality to be tested; for each functionality to be tested, analyze corresponding volume data for a period of time; and use the volume data from the production environment to generate or update a workload model for the at least one functionality, the workload model providing a framework for subsequent performance testing of the application under test.

In another aspect, there is provided a method of facilitating performance testing. The method is executed by a device having a communications module. The method includes mapping application code for an application under test to at least one performance test script to generate a functionality mapping, the test script for executing functions in the application under test. The method also includes receiving via the communications module, build release notes; determining at least one source code change from the build release notes; and receiving via the communications module, volume data from a production environment for the application under test. The method also includes using the build release notes and the functionality mapping to identify the source code changes for at least one functionality to be tested; for each functionality to be tested, analyzing corresponding volume data for a period of time; and using the volume data from the production environment to generate or update a workload model for the at least one functionality, the workload model providing a framework for subsequent performance testing of the application under test.

In another aspect, there is provided non-transitory computer readable medium for facilitating performance testing. The computer readable medium includes computer executable instructions for mapping application code for an application under test to at least one performance test script to generate a functionality mapping, the test script for executing functions in the application under test. The computer readable medium also includes instructions for receiving via a communications module, build release notes; determining at least one source code change from the build release notes; and receiving via the communications module, volume data from a production environment for the application under test. The computer readable medium also includes instructions for using the build release notes and the functionality mapping to identify the source code changes for at least one functionality to be tested; for each functionality to be tested, analyzing corresponding volume data for a period of time; and using the volume data from the production environment to generate or update a workload model for the at least one functionality, the workload model providing a framework for subsequent performance testing of the application under test.

In certain example embodiments, the device can automatically initiate a performance test via the communications module, using the workload model.

In certain example embodiments, the device can receive via the communications module, additional volume data; and use the additional volume data to refine the existing workload model or to generate a new workload model.

In certain example embodiments, the build release notes, and the volume data, can be automatically pulled from corresponding sources by the communications module.

In certain example embodiments, the at least one functionality to be tested can isolate areas of the application under test that have been updated or added since a prior release.

In certain example embodiments, the workload model can be provided to a testing environment that performs mobile and/or web browser based testing of the application under test. The mobile and/or web browser based testing can include user experience testing.

In certain example embodiments, the performance testing can be performed continuously based on a current workload model provided by the device.

In certain example embodiments, the period of time of volume data can include at least multiple months of volume data.

In certain example embodiments, the device can receive an updated test script and revise the functionality mapping using the updated test script.

FIG. 1 illustrates an exemplary computing environment 8. In this example, the computing environment 8 may include an application testing environment 10, an application development environment 12, and a communications network 14 connecting one or more components of the computing environment 8. The computing environment 8 may also include or otherwise be connected to an application deployment environment 16, which provides a platform, service, or other entity responsible for posting or providing access to applications that are ready for use by client devices. The computing environment 8 may also include or otherwise be connected to a workload modeling system 24, which facilitates performance testing by providing an intelligent regression modeling engine or platform to automate production feedback, and to optionally initiate performance testing automatically. The workload modeling system 24 provides a customized tool to automatically bridge the feedback loop from a production environment 28, by generating and executing a process to generate and/or update a workload model that can be configured to provide a framework for automatically initiating a performance test. The production environment 28 shown in FIG. 1 may represent any setting in which software and other products (e.g., client devices 26 running such software) are put into operation for their intended uses by end users. Production data 21 generated in the production environment 28 is stored in a datastore by the workload modeling system 24 to be used in generating a workload model. The production data 21 can include, among other things, volume data indicative of volumes of client devices 26 and/or applications using certain functionality in the production environment 28.

The application development environment 12 includes or is otherwise coupled to one or more repositories or other data storage elements for storing application build data 18. The application build data 18 can include any computer code and related data and information for an application to be deployed, e.g., for testing, execution or other uses.

In this example, the application build data 18 can be provided via one or more repositories and include the data and code required to perform application testing on a device or simulator. It can be appreciated that while FIG. 1 illustrates a number of test devices 22 that resemble a mobile communication device, such testing devices 22 can also include simulators, simulation devices or simulation processes, all of which may be collectively referred to herein as "test devices 22" for ease of illustration. The application testing environment 10 may include or otherwise have access to one or more repositories or other data storage elements for storing application test data 20, which includes any files, reports, information, results, metadata or other data associated with and/or generated during a test implemented within the application testing environment 10. Also shown in FIG. 1 is a client device 26, which may represent any electronic device that can be operated by a user to interact or otherwise use the workload modeling system 24 as herein described and may represent any device used for an intended purpose in the production environment 28 (e.g., by using an application developed in the application development environment 12 and/or tested in the application testing environment 10).

The computing environment 8 may be part of an enterprise or other organization that both develops and tests applications. In such cases, the communication network 14 may not be required to provide connectivity between the application development environment 12, the workload modeling system 24, and the application testing environment 10, wherein such connectivity is provided by an internal network. The application development environment 12, workload modeling system 24, and application testing environment 10 may also be integrated into the same enterprise environment as subsets thereof. That is, the configuration shown in FIG. 1 is illustrative only. Moreover, the computing environment 8 can include multiple enterprises or organizations, e.g., wherein separate organizations are configured to, and responsible for, application testing and application development. For example, an organization may contract a third-party to develop an app for their organization but perform testing internally to meet proprietary or regulatory requirements. Similarly, an organization that develops an app may outsource the testing stages, particularly when testing is performed infrequently. The application deployment environment 16 may likewise be implemented in several different ways. For example, the deployment environment 16 may include an internal deployment channel for employee devices, may include a public marketplace such as an app store, or may include any other channel that can make the app available to clients, consumers or other users.

One example of the computing environment 8 may include a financial institution system (e.g., a commercial bank) that provides financial services accounts to users and processes financial transactions associated with those financial service accounts. Such a financial institution system may provide to its customers various browser-based and mobile applications, e.g., for mobile banking, mobile investing, mortgage management, etc.

Test devices 22 can be, or be simulators for, client communication devices that would normally be associated with one or more users (e.g., client devices 26). Users may be referred to herein as customers, clients, correspondents, or other entities that interact with the enterprise or organization associated with the computing environment 8 via one or more apps. Such customer communication devices may be used outside of the computing environment 8 in which the development and testing occurs but such devices may also be used to interact with the workload modeling system 24 and/or other components in the computing environment 8. Client devices 26 are also shown within the production environment 28 and can be similar to the devices under test for using applications being developed and/or tested. That is, client device 26 shown in FIG. 1 may be a similar type of device as a customer communication device and is shown to illustrate a manner in which an individual can use applications for an intended purpose in the production environment 28 and, in at least some cases, interact with the workload modeling system 24. However, it may be noted that such customer communication devices and/or client device 26 may be connectable to the application deployment environment 16, e.g., to download newly developed apps, to update existing apps, etc.

In certain embodiments, a user may operate the customer communication devices such that customer device performs one or more processes consistent with what is being tested in the disclosed embodiments. For example, the user may use customer device to engage and interface with a mobile or web-based banking application which has been developed and tested within the computing environment 8 as herein described. In certain aspects, test devices 22, customer devices, and client devices 26 can include, but are not limited to, a personal computer, a laptop computer, a tablet computer, a notebook computer, a hand-held computer, a personal digital assistant, a portable navigation device, a mobile phone, a wearable device, a gaming device, an embedded device, a smart phone, a virtual reality device, an augmented reality device, third party portals, an automated teller machine (ATM), and any additional or alternate computing device, and may be operable to transmit and receive data across communication networks such as the communication network 14 shown by way of example in FIG. 1.

Communication network 14 may include a telephone network, cellular, and/or data communication network to connect different types of electronic devices. For example, the communication network 14 may include a private or public switched telephone network (PSTN), mobile network (e.g., code division multiple access (CDMA) network, global system for mobile communications (GSM) network, and/or any 3G, 4G, or 5G wireless carrier network, etc.), WiFi or other similar wireless network, and a private and/or public wide area network (e.g., the Internet).

Referring back to FIG. 1, the computing environment 8 may also include a cryptographic server (not shown) for performing cryptographic operations and providing cryptographic services (e.g., authentication (via digital signatures), data protection (via encryption), etc.) to provide a secure interaction channel and interaction session, etc. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public and private keys in a PKI), and perform other cryptographic operations that are required or desired for particular applications of the application development environment 12, workload modeling system 24, and/or application testing environment 10. The cryptographic server may be used to protect data within the computing environment 8 (including the application build data 18, production data 21, and/or application test data 20) by way of encryption for data protection, digital signatures or message digests for data integrity, and by using digital certificates to authenticate the identity of the users and entity devices with which the application development environment 12, workload modeling system 24, and application testing environment 10 communicate to inhibit data breaches by adversaries. It can be appreciated that various cryptographic mechanisms and protocols can be chosen and implemented to suit the constraints and requirements of the particular deployment of the application development environment 12, workload modeling system 24, and application testing environment 10 as is known in the art.

Figure 2:
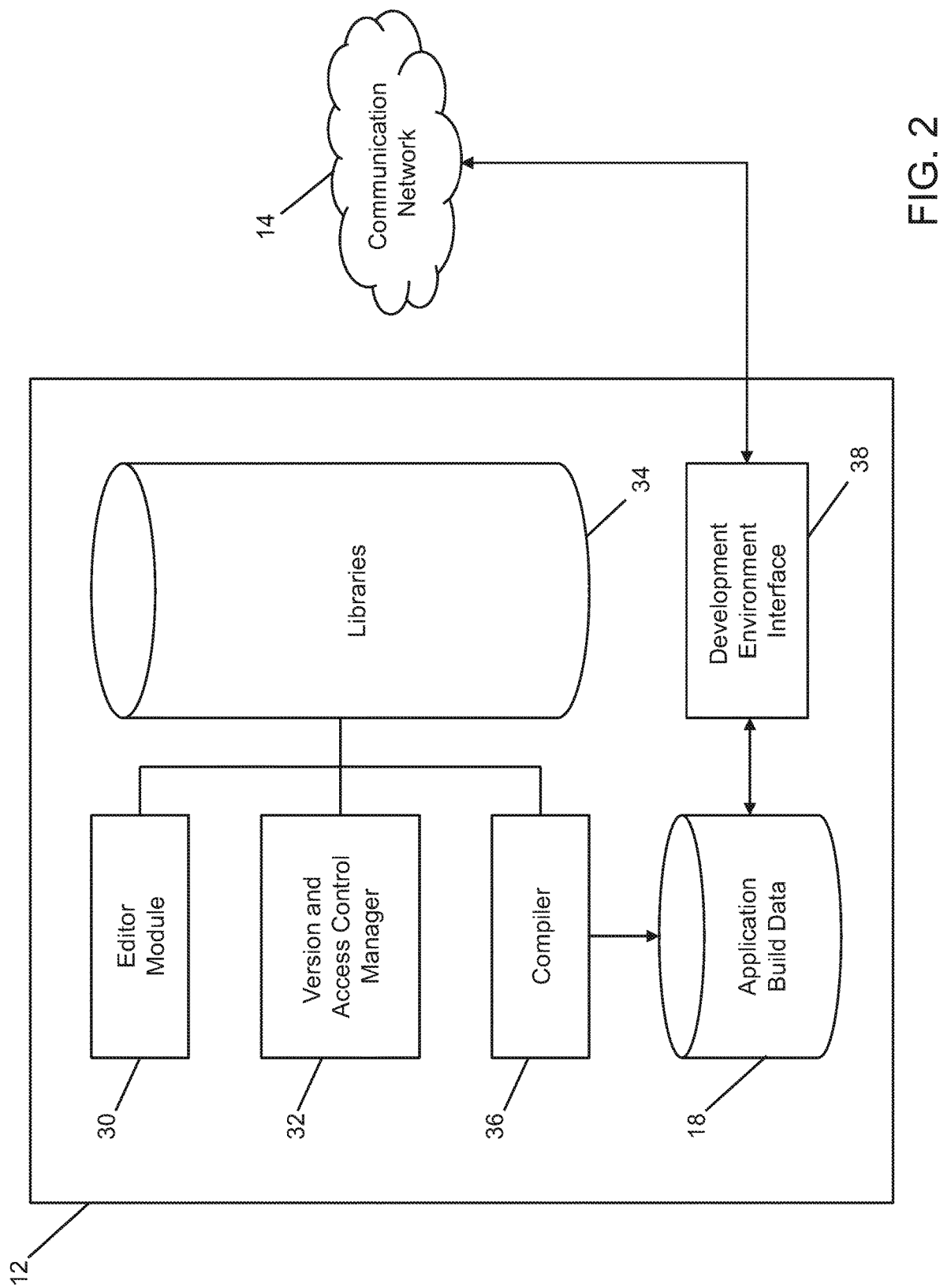
FIG. 2 is a block diagram of an example configuration of an application development environment.

In FIG. 2, an example configuration of the application development environment 12 is shown. It can be appreciated that the configuration shown in FIG. 2 has been simplified for ease of illustration. In certain example embodiments, the application development environment 12 may include an editor module, 30, a version and access control manager 32, one or more libraries 34, and a compiler 36, which would be typical components utilized in application development. In this example, the application development environment 12 also includes the application build data 18, which, while shown within the environment 12, may also be a separate entity (e.g., repository) used to store and provide access to the stored build files. The application development environment 12 also includes or is provided with (e.g., via an application programming interface (API)), a development environment interface 38. The development environment interface 38 provides communication and data transfer capabilities between the application development environment 12 and the application testing environment 10 from the perspective of the application development environment 12. As shown in FIG. 2, the development environment interface 38 can connect to the communication network 14 to send/receive data and communications to/from the application testing environment 10, including instructions or commands initiated by/from the workload modeling system 24, as discussed further below.

The editor module 30 can be used by a developer/programmer to create and edit program code associated with an application being developed. This can include interacting with the version and access control manager 32 to control access to current build files and libraries 34 while honoring permissions and version controls. The compiler 36 may then be used to compile an application build file and other data to be stored with the application build data 18. It can be appreciated that a typical application or software development environment 12 may include other functionality, modules, and systems, details of which are omitted for brevity and ease of illustration. It can also be appreciated that the application development environment 12 may include modules, accounts, and access controls for enabling multiple developers to participate in developing an application, and modules for enabling an application to be developed for multiple platforms. For example, a mobile application may be developed by multiple teams, each team potentially having multiple programmers. Also, each team may be responsible for developing the application on a different platform, such as APPLE iOS or GOOGLE ANDROID for mobile versions, and GOOGLE CHROME or MICROSOFT Edge for web browser versions. Similarly, applications may be developed for deployment on different device types, even with the same underlying operating system.

By having build files stored for all of the various operating systems, device types, and versions that are currently compatible and being used, and providing access via the development environment interface 38, the application testing environment 10 can automatically obtain and deploy the latest builds to perform application testing in different scenarios. Such scenarios can include not only different device types, operating systems, and versions, but also the same build under different operating conditions.

While not shown in FIG. 2 for clarity of illustration, in example embodiments, the application development environment 12 may be implemented using one or more computing devices such as terminals, servers, and/or databases, having one or more processors, communications modules, and database interfaces. Such communications modules may include the development environment interface 38, which enables the application development environment 12 to communicate with one or more other components of the computing environment 8, such as the application testing environment 10, via a bus or other communication network, such as the communication network 14. While not delineated in FIG. 2, the application development environment 12 (and any of its devices, servers, databases, etc.) includes at least one memory or memory device that can include a tangible and non-transitory computer-readable medium having stored therein computer programs, sets of instructions; code, or data to be executed by the one or more processors. FIG. 2 illustrates examples of modules, tools and engines stored in memory within the application development environment 12. It can be appreciated that any of the modules, tools, and engines shown in FIG. 2 may also be hosted externally and be available to the application development environment 12, e.g., via communications modules such as the development environment interface 38.

Figure 3:
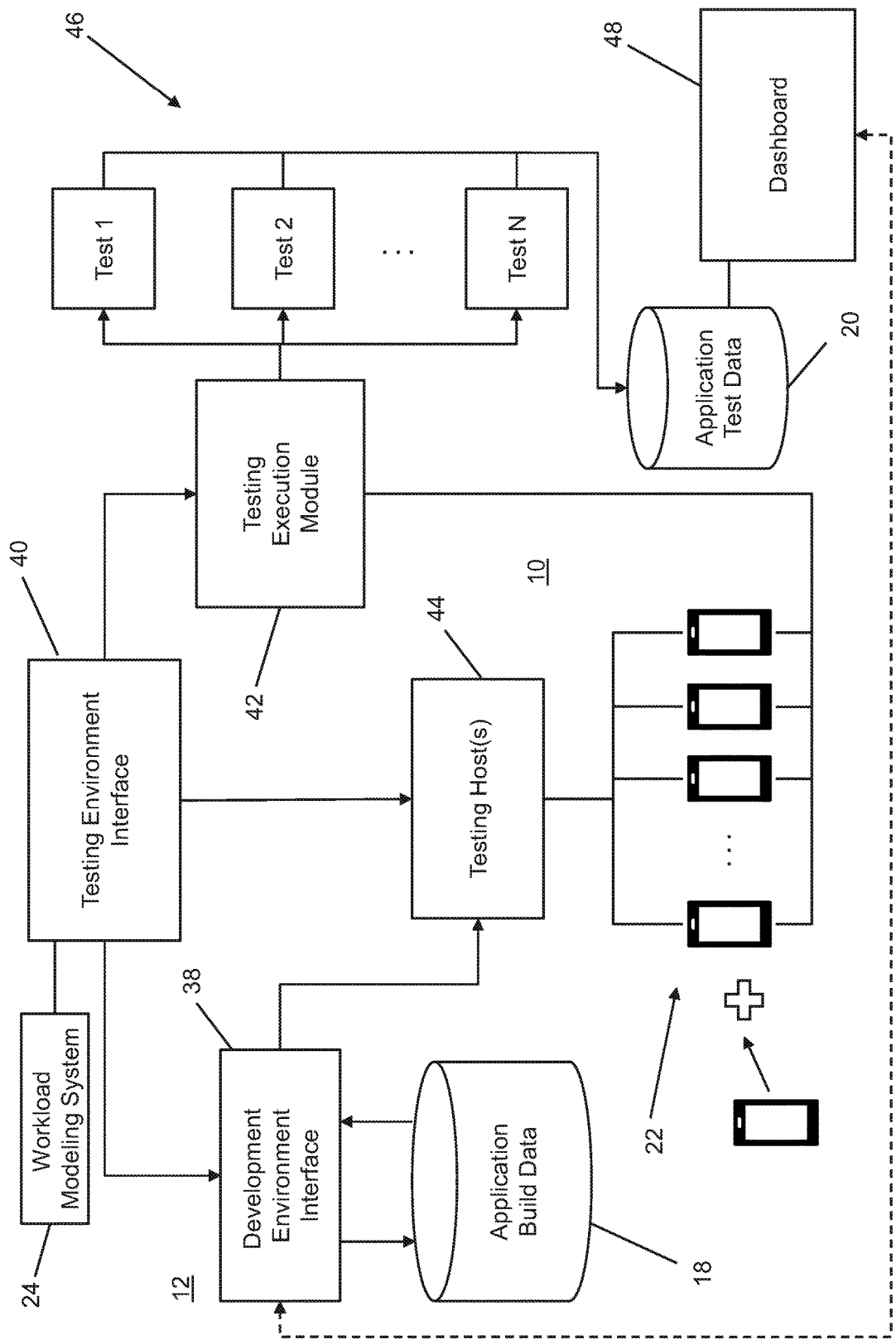
FIG. 3 is a block diagram of an example configuration of an application testing environment.

Turning now to FIG. 3, an example configuration of the application testing environment 10 is shown. The application testing environment 10 includes a testing environment interface 40, which is coupled to the development environment interface 38 in the application development environment 12, a testing execution module 42, and one or more testing hosts 44. The testing environment interface 40 can provide a UI for personnel or administrators in the application testing environment 10 to coordinate an automated build management process as herein described and to initiate or manage a test execution process as herein described. The testing environment interface 40 can also be coupled to or otherwise in communication with the workload modeling system 24 to provide such UI for personnel or administrators, e.g., via a dashboard or testing application or platform.

The testing environment interface 40 can provide a platform on which testing personnel and/or the workload modeling system 24 can operate to instruct the development environment interface 38, e.g., by sending a message or command via the communication network 14, to access the application build data 18 to obtain the latest application build(s) based on the number and types of devices being tested by the testing host(s) 44. The latest application builds are then returned to the application testing environment 10 by the development environment interface 38 to execute an automated build retrieval operation. As shown in FIG. 3, the application build data 18 can be sent directly to the testing host(s) 44 and thus the testing host(s) 44 can also be coupled to the communication network 14. It can be appreciated that the application build data 18 can also be provided to the testing host(s) 44 via the testing environment interface 40. The host(s) 44 in this example have access to a number of test devices 22 which, as discussed above, can be actual devices or simulators for certain devices. The testing host(s) 44 are also scalable, allowing for additional test devices 22 to be incorporated into the application testing environment 10. For example, a new test device 22 may be added when a new device type is released and will be capable of using the application being tested. Upon installation, the application on each test device 22 can be configured to point to the appropriate environment under test and other settings can be selected/deselected.

The test devices 22 are also coupled to the testing execution module 42 to allow the testing execution module 42 to coordinate tests 46 to evaluate metrics, for example, by executing tests for application traffic monitoring, determining UI response times, examining device logs, and determining resource utilization metrics (with Test 1, Test 2, . . . , Test N; shown in FIG. 3 for illustrative purposes). The tests 46 can generate data logs, reports and other outputs, stored as application test data 20, which can be made available to various entities or components, such as a dashboard 48. The framework shown in FIG. 3 enables the application testing environment 10 to download the latest builds from the respective repositories for the respective device/OS platform(s) and run a UI flow on all test devices 22 to configure the environment, disable system pop-ups, and set feature flags. In this way, the framework can automate the build download and installation process. The framework shown in FIG. 3 can also enable tests 46 to be initiated, status updates for such tests 46 to be obtained, and other information gathered concerning the tests 46 and/or test data 20, through commands determined and issued by the workload modeling system 24.

It can be appreciated that while the testing environment interface 40, the testing host(s) 44, and the testing execution module 42 are shown as separate modules in FIG. 3, such modules may be combined in other configurations and thus the delineations shown in FIG. 3 are for illustrative purposes.

Figure 4:
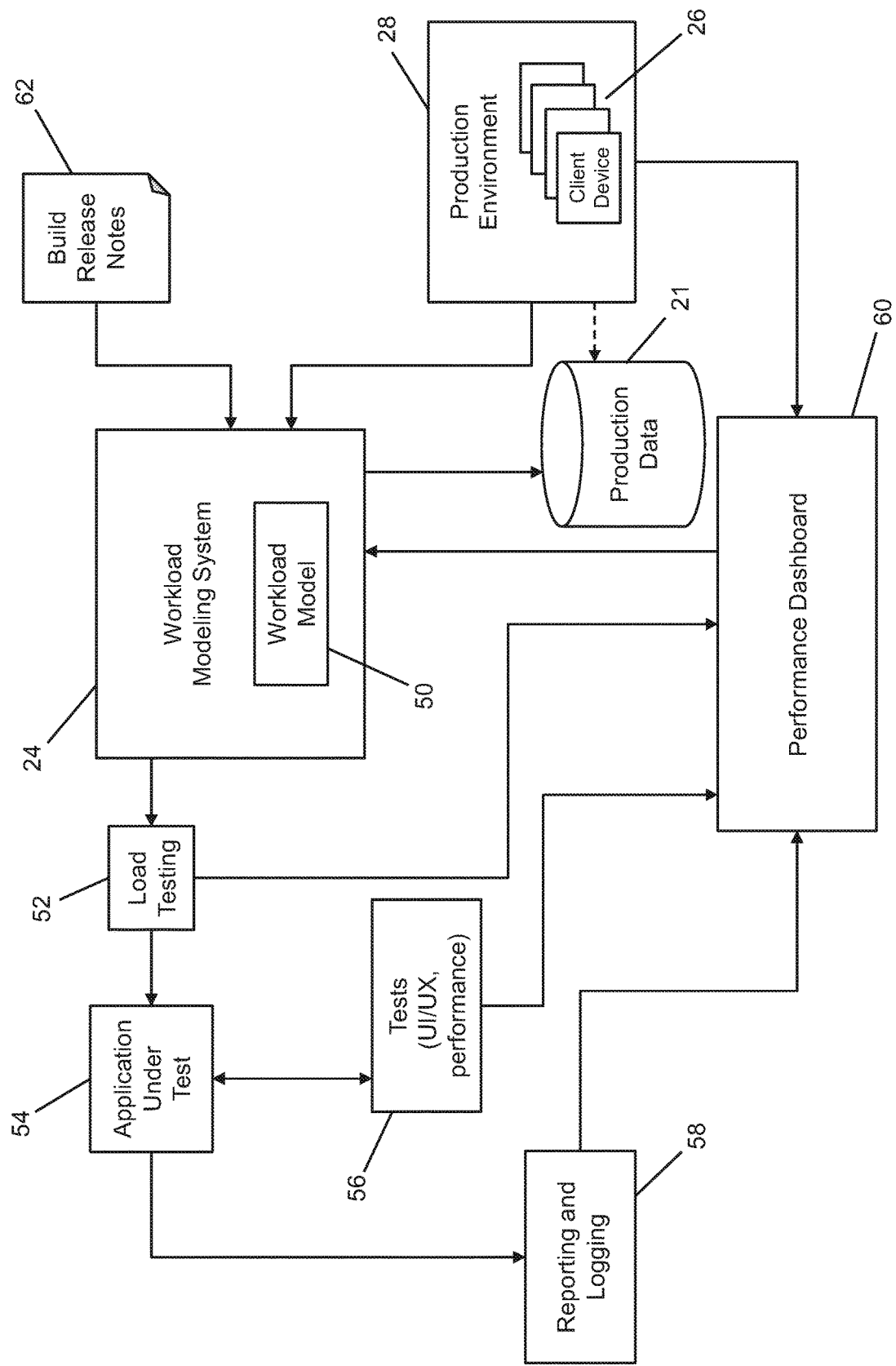
FIG. 4 is a schematic diagram of an example of a workload modelling system integrated with application development, testing, and production environments.

Referring now to FIG. 4, a schematic diagram of the workload modeling system 24, integrated with the application development environment 10, application testing environment 12, and production environment 28, is shown. The workload modeling system 24 in this configuration interfaces with these environments 10, 12, 28 to automate production feedback from the production environment 28, develop or refine a workload model 50 using such production feedback, and can initiate application testing automatically. The workload modeling system 24 can initiate or observe load testing performed by a load testing module 52, which can execute internal and/or external load tests. For example, an application under test 54 (e.g., as described above), can input a server load test or other load testing. The application under test 54 can implement various tests 56 such as user interface (UI) or user experience (UX) tests, performance tests, etc. These tests 56 not only control what is tested and how the tests are executed, the tests 56 also generate test results and analyses such as usability, thread analyses, memory analyses, etc. It can be appreciated that these results can include both mobile- and browser-based test results. The application under test 54 also typically generates reports and logs, which in this example are handled by a reporting and logging module 58. The test results and reports/logs are fed by the reporting and logging module 58, as shown in FIG. 4, to a performance dashboard 60. The performance dashboard 60 can be viewed and interacted with by administrators and testing personnel and can also feed data and visual content (e.g., graphical user interfaces (GUIs)) to the workload modeling system 24. In this way, the workload modeling system 24 can consume such data and/or provide access to the dashboard 60 to a user of the workload modeling system 24.

As shown in FIG. 4, the workload modeling system 24 can also receive build release notes 62, e.g., from the application development environment 12 and can have or have access to a datastore for storing production data 21. As shown in dashed lines in FIG. 4, it can be appreciated that the production data 21 can also be populated directly by the production environment 28. The production environment 28 is integrated with or otherwise coupled to the workload modeling system 24 to create a feedback loop for the production data 21. This allows the workload model 50 to be generated, taking into account the actual experiences of the users of the client devices 26 in the production environment 28, as described further below.

Figure 5:
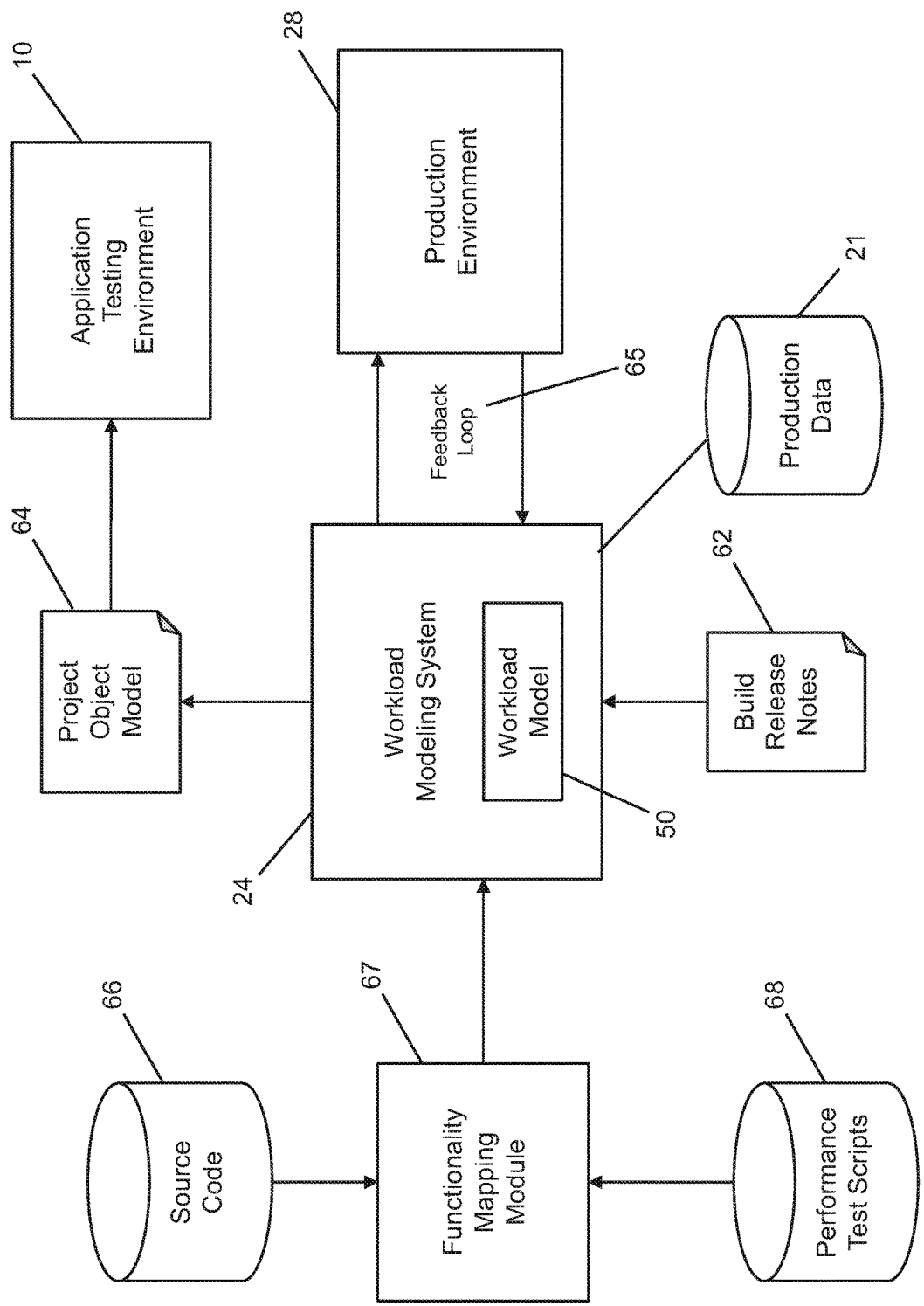
FIG. 5 is a schematic diagram of a workload modeling generation process flow.

FIG. 5 illustrates a process for generating or updating the workload model 50 by the workload modeling system 24. The process illustrated in FIG. 5 includes the data sources and an example workflow for automating a production feedback loop 65 and generating or updating the workload model 50. This enables the workload modeling system 24 to facilitate performance testing, e.g., by enabling testing to be initiated both manually and automatically in response to the analyses conducted on the production data 21.

The workload modeling system 24 includes or has access to a functionality mapping module 67, which is coupled to a datastore or repository of source code 66 or to an entity that can provide such source code 66, e.g., the application development environment 12 or application testing environment 10. The functionality mapping module 67 is also coupled to a datastore or repository of performance test scripts 68. The performance test scripts 68 define the operations and instructions that are executed in a particular performance test, e.g., which functions to load, initiate, and test. The functionality mapping module 67 is therefore configured to compare the source code 66 for an application under test with one or more performance test scripts 68 to determine which parts of the code are relevant to the functionalities associated with the scripts 68. This functionality mapping can then be used by the workload modeling system 24 with the build release notes 62 to determine what source code changes have been made, if any. This can inform the workload modeling system 24 in terms of which functionality might have been affected since a previously build release and should be analyzed with respect to the production data 21. That is, the source code 66, build release notes 62 and the functionality mapping determined from also reviewing the performance test scripts 68 can allow the workload modeling system 24 to isolate certain functions or certain types of tests relative to what is actually happing with client devices 26 in the production environment 28.

The workload modeling system 24, in addition to generating or updating/refining the workload model 50 can also generate a project object model (POM) 64 that can be embodied as an XML file that contains information about a testing project and this can be provided to the application testing environment 10 to initiate a performance test. This can be an automatic trigger or an asynchronous input to the application testing environment 10 that is then used at an appropriate time to execute one or more tests. This allows the application testing environment 10 to benefit from the additional insights provided through analyses of the production data 21 obtained by automating the production data feedback loop 65. It can be seen in FIG. 5 that the feedback loop 65 can include triggers or requests sent by the workload modeling system 24 to the production environment 28. However, this feedback loop can also be one-way in that production data 21 can be continuously fed to the workload modeling system 24. The production data 21 can include a particular period of time's worth of data, such as three months, which provides suitable data points for the volumes experienced in the production environment 28 that typically change as often as daily.

As such, with the functionalities from the build release notes 62 and the volumes data from the production environment 28, the workload modeling system 24 can automatically create the workload model 50. The workload model 50 can then be used as a framework for continuous performance testing (e.g., by generating POMs 64 for the application testing environment 10), avoiding much of the tedious manual efforts normally required.

Figure 6:
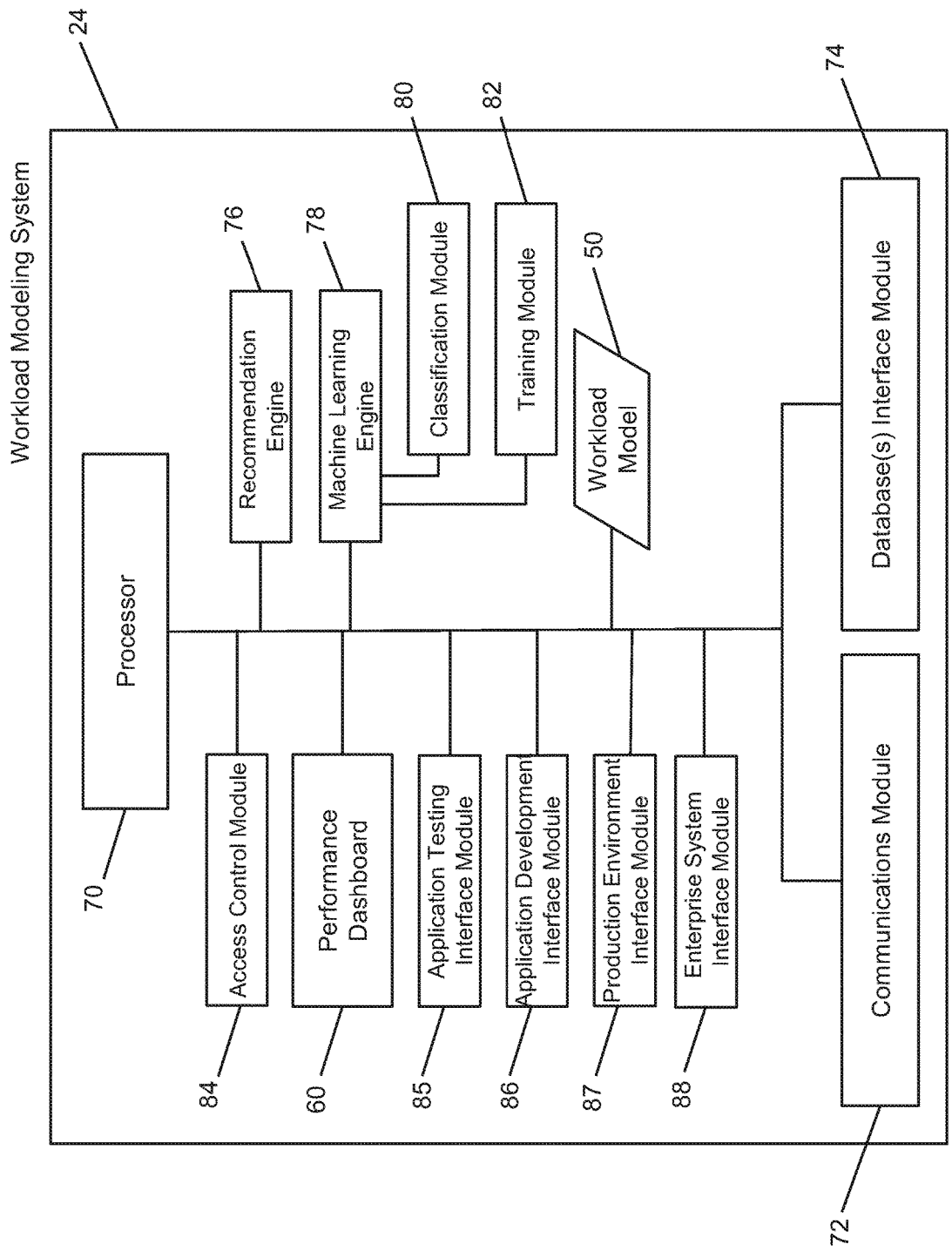
FIG. 6 is a block diagram of an example configuration of a workload modeling system.

In FIG. 6, an example configuration of the workload modeling system 24 is shown. In certain embodiments, the workload modeling system 24 may include one or more processors 70, a communications module 72, and a database(s) interface module 74 for interfacing with the datastores for the build data 18 and test data 20 to retrieve, modify, and store (e.g., add) data. Communications module 72 enables the workload modeling system 24 to communicate with one or more other components of the computing environment 8, such as client device 26 (or one of its components), via a bus or other communication network, such as the communication network 14. While not delineated in FIG. 6, the workload modeling system 24 includes at least one memory or memory device that can include a tangible and non-transitory computer-readable medium having stored therein computer programs, sets of instructions, code, or data to be executed by processor 70. FIG. 6 illustrates examples of modules, tools and engines stored in memory on the workload modeling system 24 and operated by the processor 70. It can be appreciated that any of the modules, tools, and engines shown in FIG. 6 may also be hosted externally and be available to the workload modeling system 24. e.g., via the communications module 72, In the example embodiment shown in FIG. 6, the workload modeling system 24 includes a recommendation engine 76, a machine learning engine 78, a classification module 80, a training module 82, and the workload model 50 (trained or to be trained), The workload modeling system 24 also includes an access control module 84 and an application or portal into the performance dashboard 60. The workload modeling system 24 also includes an application testing interface, module 85, an application development interface module 86, a production environment interface, module 87, and an enterprise, system interface module 88.

The recommendation engine 76 is used by the workload modeling system 24 to generate one or more recommendations for the workload modeling system 24 and/or a client device 26 that is/are related to designing or modifying a performance test based on the workload model 50 generated or updated as herein described. It may be noted that a recommendation as used herein may refer to a prediction, suggestion, inference, association or other recommended identifier that can be used to generate a suggestion, notification, test command, test instruction, script or other data that can be consumed by the workload modeling system 24 and/or the client devices 26 interacting with same. The recommendation engine 76 can access test data 20 and production data 21 and apply one or more inference processes to generate the recommendation(s). The recommendation engine 76 may utilize or otherwise interface with the machine learning engine 78 to both classify data currently being analyzed to generate a suggestion or recommendation, and to train classifiers using data that is continually being processed and accumulated by the workload modeling system 24. That is, the recommendation engine 76 can learn performance testing parameters and metrics, and revise and refine classifications, rules or other modeling-related parameters over time. For example, machine learning engine 78 can be used to update and refine the trained workload model 50 using the training module 82 as client devices 26 are used for their intended purpose in the production environment 28.

The machine learning engine 78 may also perform operations that classify the test data 20 and/or production data 21 in accordance with corresponding classifications parameters, e.g., based on an application of one or more machine learning algorithms to the data or groups of the data. The machine learning algorithms may include, but are not limited to, a one-dimensional, convolutional neural network model (e.g., implemented using a corresponding neural network library, such as Keras®), and the one or more machine learning algorithms may be trained against, and adaptively improved, using elements of previously classified profile content identifying suitable matches between content identified and potential actions to be executed. Subsequent to classifying the event- or workflow-related content or content being analyzed, the recommendation engine 76 may further process each element of the content to identify, and extract, a value characterizing the corresponding one of the classification parameters, e.g., based on an application of one or more additional machine learning algorithms to each of the elements of the test- or production-related content. By way of example, the additional machine learning algorithms may include, but are not limited to, an adaptive NLP algorithm that, among other things, predicts starting and ending indices of a candidate parameter value within each element of the content, extracts the candidate parameter value in accordance with the predicted indices, and computes a confidence score for the candidate parameter value that reflects a probability that the candidate parameter value accurately represents the corresponding classification parameter. As described herein, the one or more additional machine learning algorithms may be trained against, and adaptively improved using, the locally maintained elements of previously classified content. Classification parameters may be stored and maintained using the classification module 80, and training data may be stored and maintained using the training module 82.

The workload model 50 may also be created, stored, refined, updated, re-trained, and referenced by the workload modeling system 24 to determine suitable performance tests or testing parameters based on an analysis of the production data 21 over a period of time, such as a few months. Such analyses can be used to generate recommendations or suggestions for implementing specific tests for specific changes to functionality or to create entirely new or modified performance tests.

In some instances, classification data stored in the classification module 80 may identify one or more parameters, e.g., "classification" parameters, that facilitate a classification of corresponding elements or groups of recognized content based on any of the exemplary machine learning algorithms or processes described herein. The one or more classification parameters may correspond to parameters that can indicate an affinity/anti-affinity or compatibility/incompatibility between the test data 20 and production data 21, and certain potential actions. For example, production data 21 can indicate that certain functionality is performing poorly, and testing can be adjusted to locate the issue(s) and improve or refine the testing to isolate or pinpoint the issues.

In some instances, the additional, or alternate, machine learning algorithms may include one or more adaptive, NLP algorithms capable of parsing each of the classified portions of the content and predicting a starting and ending index of the candidate parameter value within each of the classified portions. Examples of the adaptive, NLP algorithms include, but are not limited to, NLP models that leverage machine learning processes or artificial neural network processes, such as a named entity recognition model implemented using a SpaCy® library.

Examples of these adaptive, machine learning processes include, but are not limited to, one or more artificial, neural network models, such as a one-dimensional, convolutional neural network model, e.g., implemented using a corresponding neural network library, such as Keras®. In some instances, the one-dimensional, convolutional neural network model may implement one or more classifier functions or processes, such a Softmax® classifier, capable of predicting an association between an element of event data and a single classification parameter and additionally, or alternatively, multiple classification parameters.

Based on the output of the one or more machine learning algorithms or processes, such as the one-dimensional, convolutional neural network model described herein, machine learning engine 78 may perform operations that classify each of the discrete elements of event- or workflow-related content as a corresponding one of the classification parameters, e.g., as obtained from classification data stored by the classification module 80.

The outputs of the machine learning algorithms or processes may then be used by the recommendation engine 76 to generate one or more suggested recommendations, instructions, commands, notifications, rules, or other instructional or observational elements that can be presented to the workload modeling system 24 and/or the client device 26 interacting with same.

Referring again to FIG. 6, the access control module 84 may be used to apply a hierarchy of permission levels or otherwise apply predetermined criteria to determine what test data 20, production data 21, or other client/user, financial or transactional data can be shared with which entity in the computing environment 8. For example, the workload modeling system 24 may have been granted access to certain sensitive user profile data for a user, which is associated with a certain client device 26 in the computing environment 8. Similarly, certain client data may include potentially sensitive information such as age, date of birth, or nationality, which may not necessarily be needed by the workload modeling system 24 to execute certain actions (e.g., to more accurately determine the spoken language or conversational style of that user). As such, the access control module 84 can be used to control the sharing of certain client data or chat data, a permission or preference, or any other restriction imposed by the computing environment 8 or application in which the workload modeling system 24 is used.

The workload modeling system 24 in this example also includes the performance dashboard 60 described above, which provides a user interface for users of the workload modeling system 24. The workload modeling system 24 also includes the application testing interface module 85 to enable the workload modeling system 24 to interface and communicate with the application testing environment 10, the application development interface module 86 to enable the workload modeling system 24 to interface and communicate with the application development environment 12, the production environment interface module 87 to enable the workload modeling system 24 to interface and communicate with the production environment 28, and the enterprise system interface module 88 to enable the workload modeling system 24 to interface and communicate with the enterprise system 90 (see FIG. 7) to provide a GUI or API connectivity to communicate with an enterprise system 90. For example, the enterprise system interface module 88 can be used to obtain client data 98 for a certain user interacting with the workload modeling system 24. It can be appreciated that the enterprise system interface module 88 may also provide a web browser-based interface, an application or "app" interface, a machine language interface, etc.

As illustrated in FIG. 6, the workload modeling system 24 can be considered one or more devices having a processor 70, memory and a communications module 72 configured to work with, or as part of, the computing environment 8, to perform the operations described herein. It can be appreciated that the various elements of the workload modeling system 24 are shown delineated as such in FIG. 6 for illustrative purposes and clarity of description and could be provided using other configurations and distribution of functionality and responsibilities.

Figure 7:
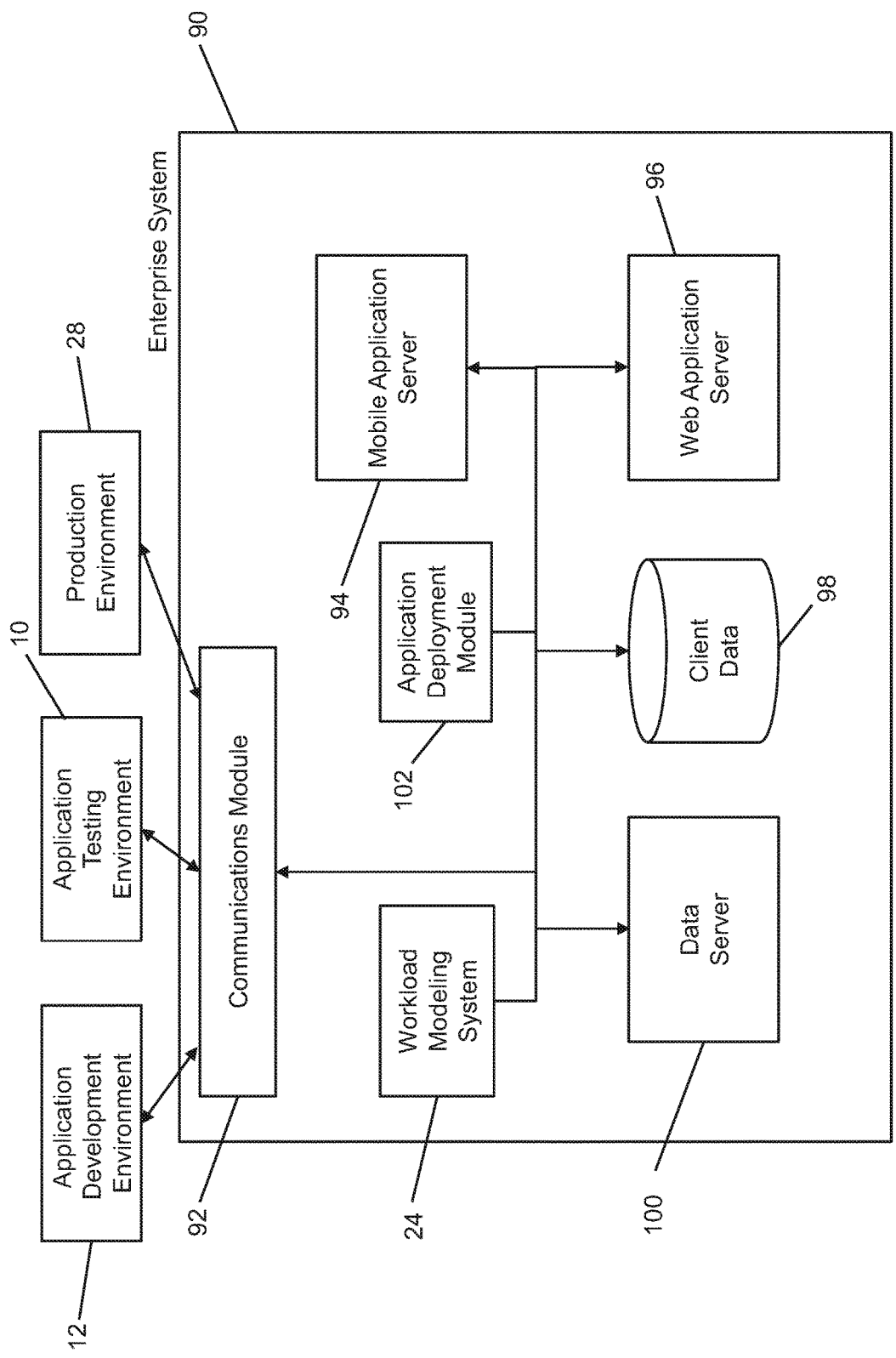
FIG. 7 is a block diagram of an example configuration of an enterprise system.

In FIG. 7, an example configuration of an enterprise system 90 is shown. The enterprise system 90 includes a communications module 92 that enables the enterprise system 90 to communicate with one or more other components of the computing environment 8, such as the application testing environment 10, application development environment 12, production environment 28, or workload modeling system 24, via a bus or other communication network, such as the communication network 14. While not delineated in FIG. 7, the enterprise system 90 includes at least one memory or memory device that can include a tangible and non-transitory computer-readable medium having stored therein computer programs, sets of instructions, code, or data to be executed by one or more processors (not shown for clarity of illustration). FIG. 7 illustrates examples of servers and datastores/databases operable within the enterprise system 90. It can be appreciated that any of the components shown in FIG. 7 may also be hosted externally and be available to the enterprise system 90, e.g., via the communications module 92. In the example embodiment shown in FIG. 7, the enterprise system 90 includes one or more servers to provide access to client data 98, e.g., to assist in analyzing the test data 20 and/or production data 21 when generating the workload model 50. Exemplary servers include a mobile application server 94, a web application server 96 and a data server 100. Although not shown in FIG. 7, the enterprise system 90 may also include a cryptographic server for performing cryptographic operations and providing cryptographic services. The cryptographic server can also be configured to communicate and operate with a cryptographic infrastructure. The enterprise system 90 may also include one or more data storage elements for storing and providing data for use in such services, such as data storage for storing client data 98.

Mobile application server 94 supports interactions with a mobile application installed on client device 26 (which may be similar or the same as a test device 22). Mobile application server 94 can access other resources of the enterprise system 90 to carry out requests made by, and to provide content and data to, a mobile application on client device 26. In certain example embodiments, mobile application server 94 supports a mobile banking application to provide payments from one or more accounts of user, among other things.

Web application server 96 supports interactions using a website accessed by a web browser application running on the client device. It can be appreciated that the mobile application server 94 and the web application server 96 can provide different front ends for the same application, that is, the mobile (app) and web (browser) versions of the same application. For example, the enterprise system 90 may provide a banking application that be accessed via a smartphone or tablet app while also being accessible via a browser on any browser-enabled device.

The client data 98 can include, in an example embodiment, financial data that is associated with users of the client devices (e.g., customers of the financial institution). The financial data may include any data related to or derived from financial values or metrics associated with customers of a financial institution system (i.e., the enterprise system 60 in this example), for example, account balances, transaction histories, line of credit available, credit scores, mortgage balances, affordability metrics, investment account balances, investment values and types, among many others. Other metrics can be associated with the financial data, such as financial health data that is indicative of the financial health of the users of the client devices 26.

An application deployment module 102 is also shown in the example configuration of FIG. 7 to illustrate that the enterprise system 90 can provide its own mechanism to deploy the developed and tested applications onto client devices 26 within the enterprise. It can be appreciated that the application deployment module 102 can be utilized in conjunction with a third-party deployment environment such as an app store to have tested applications deployed to employees and customers/clients.

Figure 8:
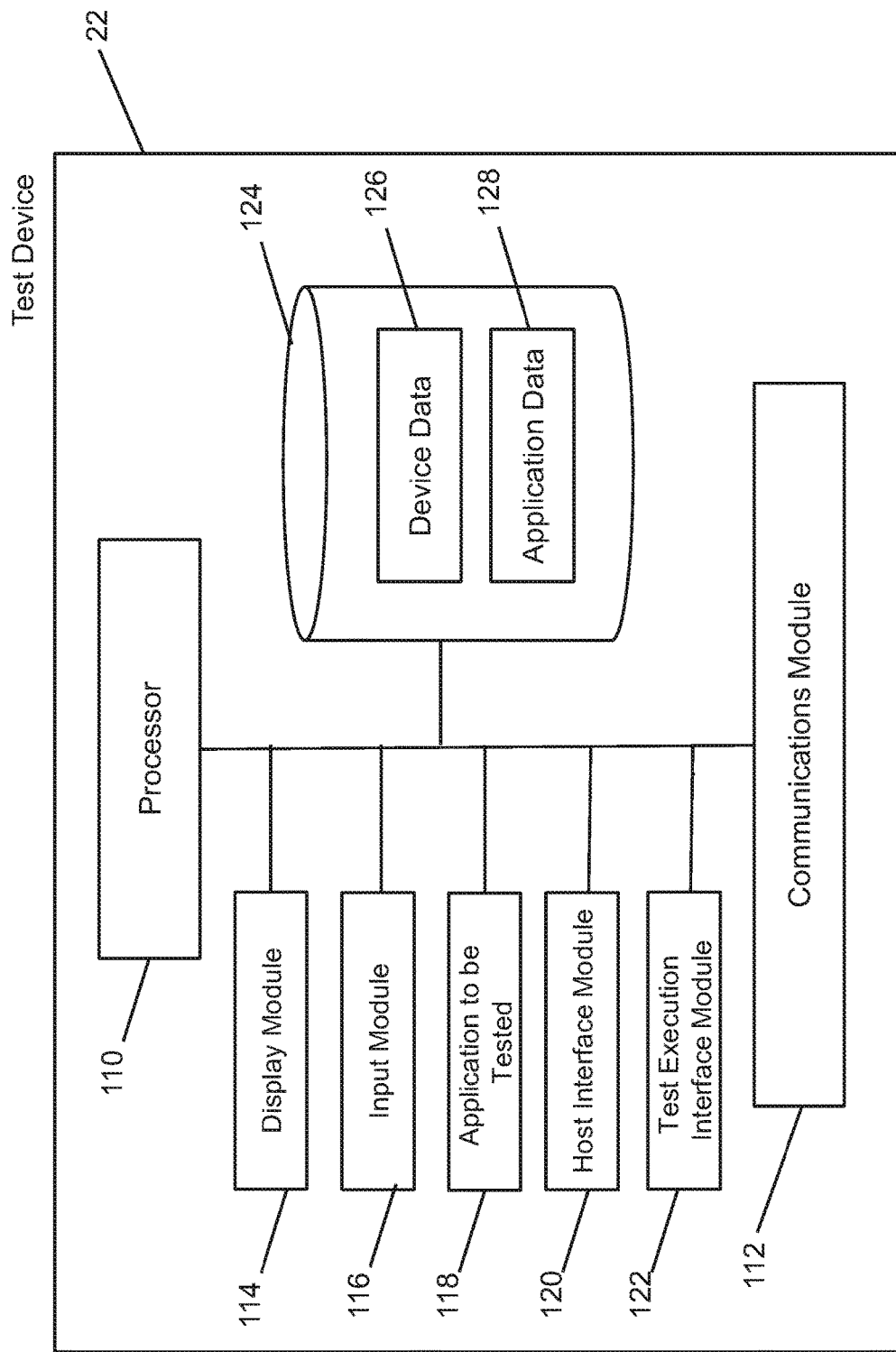
FIG. 8 is a block diagram of an example configuration of a test device used to test an application build in the application testing environment.

In FIG. 8, an example configuration of a test device 22 is shown. It can be appreciated that the test device 22 shown in FIG. 8 can correspond to an actual device (e.g., a client device 26) or represent a simulation of such a device 22. In certain embodiments, the test device 22 may include one or more processors 110, a communications module 112, and a data store 124 storing device data 126 and application data 128. Communications module 112 enables the test device 22 to communicate with one or more other components of the computing environment 8 via a bus or other communication network, such as the communication network 14. While not delineated in FIG. 8, the test device 22 includes at least one memory or memory device that can include a tangible and non-transitory computer-readable medium having stored therein computer programs, sets of instructions, code, or data to be executed by processor 110. FIG. 8 illustrates examples of modules and applications stored in memory on the test device 22 and operated by the processor 110. R can be appreciated that any of the modules and applications shown in FIG. 8 may also be hosted externally and be available to the test device 22, e.g., via the communications module 112.

In the example embodiment shown in FIG. 8, the test device 22 includes a display module 114 for rendering GUIs and other visual outputs on a display device such as a display screen, and an input module 116 for processing user or other inputs received at the test device 22, e.g., via a touchscreen, input button, transceiver, microphone, keyboard, etc. The test device 22 may also include an application 118 to be tested that includes the latest application build data 18 to be tested using the test device 22, e.g., by executing tests. The test device 22 may include a host interface module 120 to enable the test device 22 to interface with a testing host for loading an application build. The test device 22 in this example embodiment also includes a test execution interface module 122 for interfacing the application 118 with the testing execution module. The data store 124 may be used to store device data 126, such as, but not limited to, an IP address or a MAC address that uniquely identifies test device 22. The data store 124 may also be used to store application data 128, such as, but not limited to, login credentials, user preferences, cryptographic data (e.g., cryptographic keys), etc.

Figure 9:
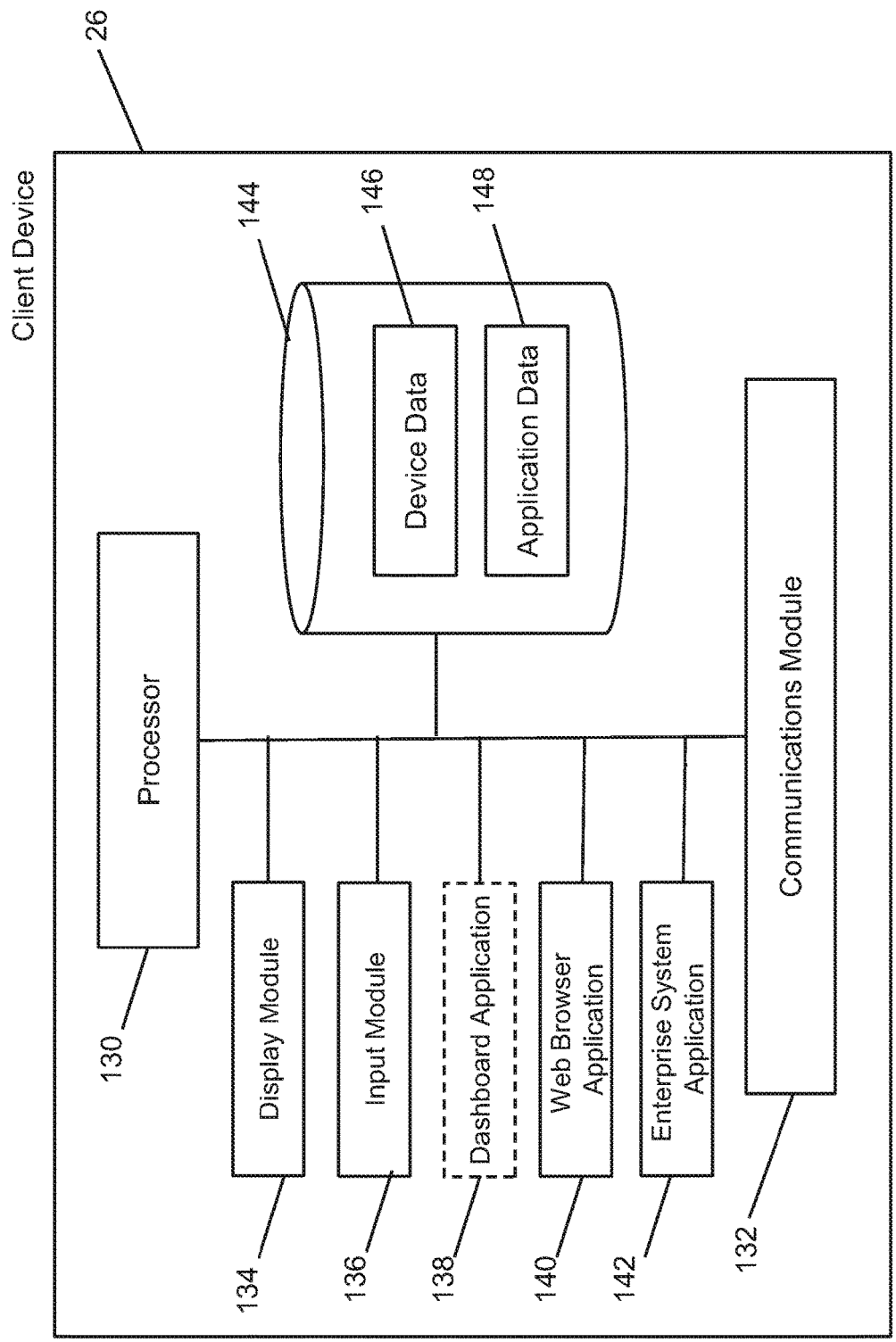
FIG. 9 is a block diagram of an example configuration of a client device used to interface with, for example, the workload modeling system and/or used in an intended operation in the production environment.

In FIG. 9, an example configuration of the client device 26 is shown. In certain embodiments, the client device 26 may include one or more processors 130, a communications module 132, and a data store 144 storing device data 146 and application data 148. Communications module 132 enables the client device 26 to communicate with one or more other components of the computing environment 8, such as the workload modeling system 24 and/or production environment 28, via a bus or other communication network, such as the communication network 14. While not delineated in FIG. 9, the client device 26 includes at least one memory or memory device that can include a tangible and non-transitory computer-readable medium having stored therein computer programs, sets of instructions, code, or data to be executed by processor 130. FIG. 9 illustrates examples of modules and applications stored in memory on the client device 26 and operated by the processor 130. It can be appreciated that any of the modules and applications shown in HG. 9 may also be hosted externally and be available to the client device 26, e.g., via the communications module 132.

In the example embodiment shown in FIG. 9, the client device 26 includes a display module 134 for rendering GUIs and other visual outputs on a display device such as a display screen, and an input module 136 for processing user or other inputs received at the client device 26, e.g., via a touchscreen, input button, transceiver, microphone, keyboard, etc. The client device 26 may also include a dashboard application 138, which may take the form of a customized app, plug-in, widget, or software component provided by the workload modeling system 24 for use by the client device 26 when being used as an interface device with the workload modeling system 24. Similarly, the client device 26 may include an enterprise system application 142 provided by their enterprise system 90. The client device 26 in this example embodiment also includes a web browser application 140 for accessing Internet-based content, e.g., via a mobile or traditional website. The data store 144 may be used to store device data 146, such as, but not limited to, an IP address or a MAC address that uniquely identifies client device 26 within environment 8. The data store 144 may also be used to store application data 148, such as, but not limited to, login credentials, user preferences, cryptographic data (e.g., cryptographic keys), etc.

It will be appreciated that only certain modules, applications, tools and engines are shown in FIGS. 2 to 9 for ease of illustration and various other components would be provided and utilized by the application testing environment 10, application development environment 12, workload modeling system 24, production environment 28, test device 22, enterprise system 90, and client device 26 as is known in the art.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by an application, module, or both. Any such computer storage media may be part of any of the servers or other devices in the application testing environment 10, application development environment 12, workload modeling system 24, production environment 28, enterprise system 90, client device 26, or test device 22, or accessible or connectable thereto. Any application or module herein described may be implemented using computer readable/executable instructions that may be stored or otherwise held by such computer readable media.

Figure 10:
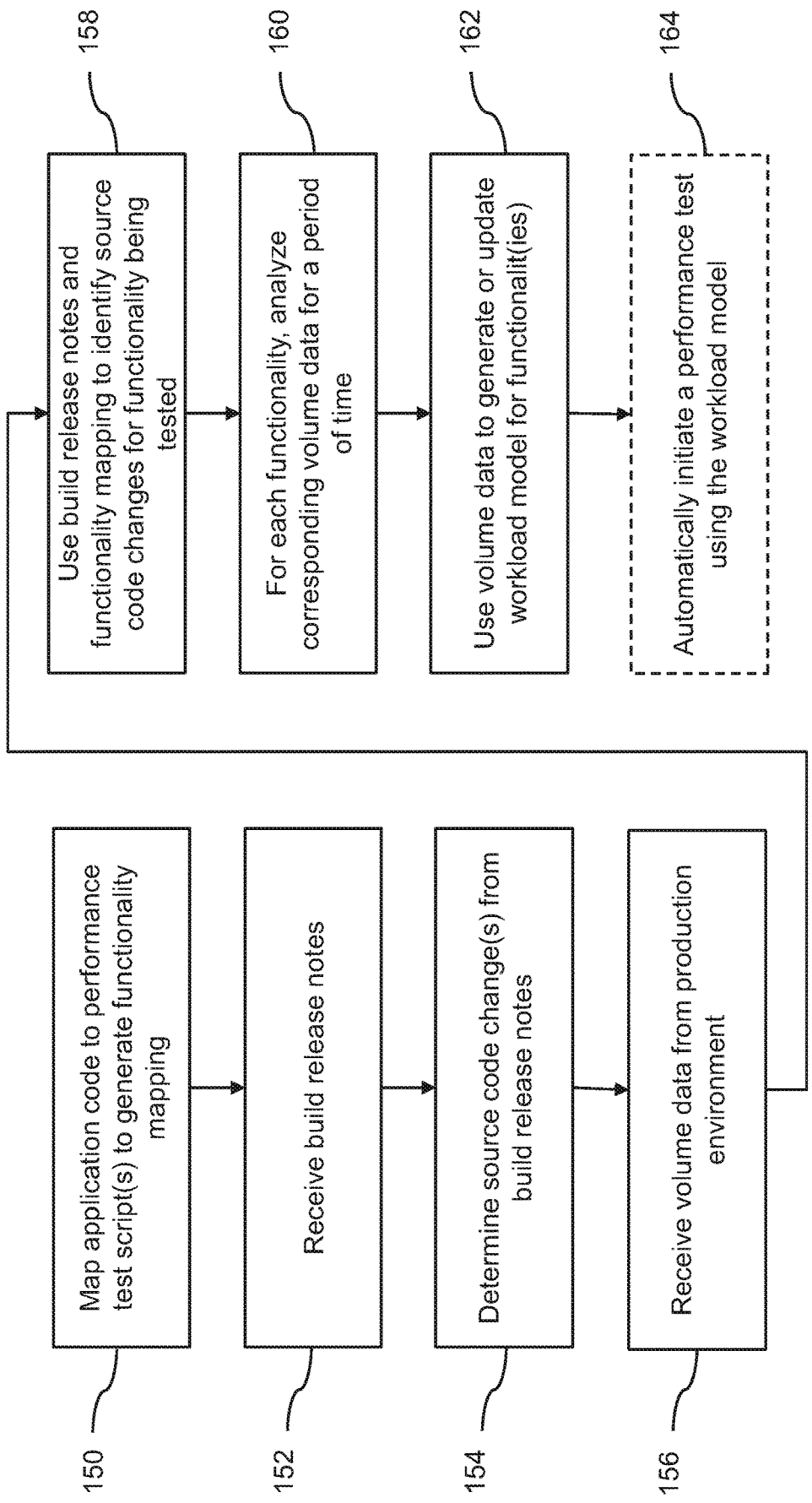
FIG. 10 is a flow diagram of an example of computer executable instructions for facilitating performance testing by generated or updating a workload model.

Referring to FIG. 10, an example embodiment of computer executable instructions for facilitating performance testing by generating and/or refining a workload model 50, is shown. At block 150, the workload modeling system 24 uses the functionality mapping module 67 to map the application code (e.g., source code 66) to one or more performance test scripts 68. As discussed above, this enables the workload modeling system 24 to generate a functionality mapping to determine what portions of code correspond to which function(s). At block 152, the workload modeling system 24 also receives or otherwise obtains the build release notes 62, which provide insight into which changes in functionality have been made recently, and thus could be more likely to be affected when client devices 26 are used in the production environment 28 and be observable in the latest volumes of production data 21. For example, a recent change to functions initiated when an application loads could have affected load times causing issues in the production environment 28 that might not have been caught in application testing if that load time is affected by volume fluctuations in server calls.

At block 154, the workload modeling system 24 determines the source code change(s) from the build release notes 62. At block 156 (which may occur in tandem with analyzing the build release notes 62 and mapping the application code at block 150), the workload modeling system 24 also receives the volume data (i.e., the production data 21 for a certain period of time) from the production environment 28. This can be in real-time directly from the production environment 28, or by accessing the datastore storing the production data 21 as illustrated herein.

At block 158, the workload modeling system 24 uses the build release notes and the functionality mapping to identify source code changes for certain functionality being tested. Then, at block 160, for each functionality being tested (or to be tested), the workload modeling system 24 analyzes the corresponding volume of production data 21 for a predetermined period of time (e.g., three months) or based on what is currently available. Thus, at block 160, the volume data is used to generate or update the workload model 162 to account for changes to these functionalities, e.g., to automatically initiate a performance test at block 164, for these functionalities. It can be appreciated that block 164 is shown in dashed lines as the initiation of a performance test can be an optional operation performed by the workload modeling system 24.

Additional volume data can also be received at block 156 without necessarily requiring a new functionality mapping or during the same build (such that no new build release notes 62 exist). In such a case, the workload modeling system 24 can re-execute blocks 158-162 to refine the workload model 50 based on the new volume data. This can be particularly advantageous when the workload modeling system 24 periodically or continuously receives new production data 21 from the production environment 28 to dynamically adapt to changing volumes in the production environment 28.

Similarly, updated test scripts 68 may be received periodically, enabling the functionality mapping(s) to be correspondingly updated.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A device for facilitating performance testing, the device comprising:
   a processor; and
   a memory coupled to the processor, the memory storing computer executable instructions that when executed by the processor cause the processor to:
     map source code for an application under test to at least one performance test script to generate a functionality mapping, the application including at least one functionality, and the at least one performance test script for executing functions of the application;

prior to receiving volume data, receive build release notes;
determine at least one source code change from the received build release notes;
subsequent to generating the functionality mapping, receive the volume data from a production environment for the application;
use the received build release notes and the functionality mapping to identify at least one application functionality associated with the at least one source code change, wherein the identified at least one application functionality isolates one or more areas of the application that have been updated or added since a prior release;
for each identified application functionality, analyze corresponding volume data for a period of time;
generate, based on the analyzing, a trained workload model for the identified at least one functionality, the trained workload model providing a framework for subsequent performance testing of the application;
determine one more performance tests based on the trained workload model; and
automatically initiate at least one of the one or more performance tests using the trained workload model.

2. The device of claim 1, wherein the computer executable instructions further cause the processor to:
update the trained workload model based on updated functionality mappings; and
automatically initiate a subsequent test of the one or more performance tests using the updated trained workload model.

3. The device of claim 2, wherein the trained workload model is provided to a testing environment that performs mobile and/or web browser based testing of the application under test.

4. The device of claim 3, wherein the mobile and/or web browser based testing comprises user experience testing.

5. The device of claim 2, wherein the performance testing is performed continuously based on a current workload model provided by the device.

6. The device of claim 1, wherein the computer executable instructions further cause the processor to:
receive additional volume data; and
use the additional volume data to refine the trained workload model or to generate a new trained workload model.

7. The device of claim 1, wherein the build release notes and the volume data are automatically pulled from corresponding sources.

8. The device of claim 1, wherein the period of time of volume data comprises at least a plurality of months of volume data.

9. The device of claim 1, wherein the computer executable instructions further cause the processor to:
receive an updated test script; and
revise the functionality mapping using the updated test script.

10. A method of facilitating performance testing, the method executed by a device, the method comprising:
mapping source code for an application under test to at least one performance test script to generate a functionality mapping, the application including at least one functionality, and the at least one performance test script for executing functions of the application;
prior to receiving volume data, receiving build release notes;
determining at least one source code change from the received build release notes;
subsequent to generating the functionality mapping, receiving the volume data from a production environment for the application;
using the received build release notes and the functionality mapping to identify at least one application functionality associated with the at least one source code change, wherein the identified at least one application functionality isolates one or more areas of the application that have been updated or added since a prior release;
for each identified application functionality, analyzing corresponding volume data for a period of time;
generating, based on the analyzing, a trained workload model for the identified at least one functionality, the trained workload model providing a framework for subsequent performance testing of the application;
determining one more performance tests based on the trained workload model; and
automatically initiating at least one of the one or more performance tests using the trained workload model.

11. The method of claim 10, further comprising:
updating the trained workload model based on updated functionality mappings; and
automatically initiating a subsequent test of the one or more performance tests using the updated trained workload model.

12. The method of claim 11, wherein the trained workload model is provided to a testing environment that performs mobile and/or web browser based testing of the application under test.

13. The method of claim 11, wherein the performance testing is performed continuously based on a current workload model provided by the device.

14. The method of claim 10, further comprising:
receiving additional volume data; and
using the additional volume data to refine the trained workload model or to generate a new trained workload model.

15. The method of claim 10, wherein the build release notes and the volume data are automatically pulled from corresponding sources.

16. The method of claim 10, wherein the period of time of volume data comprises at least a plurality of months of volume data.

17. The method of claim 10, further comprising:
receiving an updated test script; and
revising the functionality mapping using the updated test script.

18. A non-transitory computer readable medium for facilitating performance testing, the computer readable medium comprising computer executable instructions for:
mapping source code for an application under test to at least one performance test script to generate a functionality mapping, the application including at least one functionality, and the at least one performance test script for executing functions of the application;
prior to receiving volume data, receiving build release notes;
determining at least one source code change from the received build release notes;
subsequent to generating the functionality mapping, receiving the volume data from a production environment for the application;
using the received build release notes and the functionality mapping to identify at least one application functionality associated with the at least one source code change, wherein the identified at least one application functionality isolates one or more areas of the application that have been updated or added since a prior release;

for each identified application functionality, analyzing corresponding volume data for a period of time;

generating, based on the analyzing, a trained workload model for the identified at least one functionality, the trained workload model providing a framework for subsequent performance testing of the application;

determining one more performance tests based on the trained workload model; and automatically initiating at least one of the one or more performance tests using the trained workload model.

* * * * *